(12) United States Patent
Omi

(10) Patent No.: US 7,623,302 B2
(45) Date of Patent: Nov. 24, 2009

(54) CAM DRIVE MECHANISM, LENS BARREL AND CAMERA

(75) Inventor: Junichi Omi, Yokohama (JP)

(73) Assignee: Nikon Corporation, Tokyo (JP)

( * ) Notice: Subject to any disclaimer, the term of this patent is extended or adjusted under 35 U.S.C. 154(b) by 149 days.

(21) Appl. No.: 11/922,220

(22) PCT Filed: Jun. 19, 2006

(86) PCT No.: PCT/JP2006/312246
§ 371 (c)(1),
(2), (4) Date: Dec. 14, 2007

(87) PCT Pub. No.: WO2006/137362
PCT Pub. Date: Dec. 28, 2006

(65) Prior Publication Data
US 2009/0046377 A1 Feb. 19, 2009

(30) Foreign Application Priority Data
Jun. 20, 2005 (JP) .............................. 2005-179066

(51) Int. Cl.
G02B 15/14 (2006.01)
(52) U.S. Cl. ...................................... 359/700; 359/819
(58) Field of Classification Search .................. 359/700, 359/699, 694, 819, 822, 823, 826
See application file for complete search history.

(56) References Cited

U.S. PATENT DOCUMENTS 5,062,917 A * 11/1991 Zodrow ...................... 156/568
5,995,301 A   11/1999 Higuchi et al.
6,094,534 A    7/2000 Omiya

FOREIGN PATENT DOCUMENTS

| JP | A-05-119248 | 5/1993 |
|----|-------------|--------|
| JP | A-09-049958 | 2/1997 |
| JP | A-09-243897 | 9/1997 |
| JP | A-10-031150 | 2/1998 |
| JP | A-11-084204 | 3/1999 |
| JP | A-11-218659 | 8/1999 |
| JP | A-2001-221941 | 8/2001 |

* cited by examiner

*Primary Examiner*—Timothy J Thompson
(74) *Attorney, Agent, or Firm*—Oliff & Berridge, PLC (57) ABSTRACT

A cam drive mechanism includes: a cylinder in which a cam groove is formed from one end face of an inner circumferential surface toward another end with a forming mold; a drive target object that comprises a cam follower to engage in the cam groove and is linearly driven along a rotational axis of the cylinder as the cylinder rotates; and a pressing member that presses the cam follower against a cam surface constituting a side surface of the cam groove. The cam surface is formed to have varying gradients so as to enable adjustment of an extent of displacement of the drive target object per unit of rotational angle by which the cylinder rotates and the cam groove is formed in a shape that allows the forming mold to be extracted from the cylinder through rotational extraction.

10 Claims, 10 Drawing Sheets

CAM DRIVE MECHANISM, LENS BARREL AND CAMERA

TECHNICAL FIELD

The present invention relates to a cam drive mechanism that drives a drive target object by rotating a cylinder with a cam groove formed in the inner circumferential surface thereof, a lens barrel and a camera.

BACKGROUND ART

In a lens barrel of, for instance, a camera, a cylinder (hereafter referred to as a cam cylinder) with a cam groove formed at the inner circumferential surface thereof is rotatably disposed so as to rotate around the optical axis. Operations such as zooming are executed by engaging or fitting a cam follower projecting from a lens unit in the cam groove and driving the lens unit forward/backward along the optical axis as the cam cylinder rotates. The extent of lens displacement per unit of rotational angle by which the cam cylinder rotates is determined in correspondence to the gradient of the cam groove and the relationship between the extent of lens displacement and the unit of rotational angle remains constant as long as the gradient of the cam groove is uniform, i.e., as long as the cam groove forms a single straight line in a plan development of the cam cylinder. There is a structure that allows the extent of lens displacement relative to the unit of rotational angle by which the cam cylinder rotates to be variable by altering the gradient of the cam groove (see patent reference literature 1). Patent reference literature 1 also discloses a method for forming such a cam groove at the inner circumferential surface of a cam cylinder by using a plurality of split molds.

Patent reference literature 1: Japanese Laid Open Patent Publication No. 2001-221941

DISCLOSURE OF THE INVENTION

Problems to be Solved by the Invention

A cam groove must be formed at the inner circumferential surface of a cam cylinder with a small diameter (approximately 20 mm or less) with a one-piece mold instead of a plurality of split molds that do not assure a satisfactory level of strength. A one-piece mold, which, unlike split molds, cannot be extracted by offsetting it toward the optical axis, must be extracted along the optical axis through rotational extraction by rotating the mold around the optical axis. The mold is extracted through rotational extraction much the same way as a screw is turned out of a screw hole, and thus, the gradient of the cam groove, which is equivalent to the screw thread groove, must be uniform to allow the rotational extraction. However, if the cam groove changes its gradient, as in patent reference literature 1, the mold cannot be extracted through rotational extraction.

Means for Solving the Problems

A cam drive mechanism according to a first aspect of the present invention includes: a cylinder in which a cam groove is formed from one end face of an inner circumferential surface toward another end with a forming mold; a drive target object that comprises a cam follower to engage in the cam groove and is linearly driven along a rotational axis of the cylinder as the cylinder rotates; and a pressing member that presses the cam follower against a cam surface constituting a side surface of the cam groove, wherein the cam surface is formed to have varying gradients so as to enable adjustment of an extent of displacement of the drive target object per unit of rotational angle by which the cylinder rotates and the cam groove is formed in a shape that allows the forming mold to be extracted from the cylinder through rotational extraction.

In the cam drive mechanism according to the first aspect, it is preferable that another side surface of the cam groove facing opposite the cam surface has a gradient equal to or shallower than a gradient of the cam surface over an area with a shallowest gradient. It is preferable that the cam surface includes a first cam surface and a second cam surface with a gradient shallower than the first cam surface; and that a gradient of the entire other side surface facing opposite the cam surface at the cam groove is equal to a gradient of the second cam surface and the other side surface and the second cam surface are set apart from each other over a distance substantially equal to a diameter of the cam follower.

In the cam drive mechanism according to the first aspect, the cylinder may be a cam cylinder with a diameter equal to or less than 20 mm, that is formed by using a one-piece forming mold. The cam groove may have a greater width toward the one end face.

In the cam drive mechanism according to the first aspect, it is preferable that the drive target object comprises a lens; and that the rotational axis of the cylinder aligns with an optical axis of the lens. The cam surface may have a first area over which the lens moves between a retracted position and a first drive position, and a second area over which the lens moves between the first drive position and a second drive position; and a gradient at the first area may be shallower than a gradient at the second area. The first area may be a lens set/reset area used during a preparatory phase for a photographing operation by using the lens, and the second area may be a zoom area used for zooming during the photographing operation by using the lens.

A lens barrel according to a second aspect of the present invention includes a cam drive mechanism according to the first aspect.

A camera according to a third aspect of the present invention includes a lens barrel according to the second aspect.

Advantageous Effect of the Invention

According to the present invention, a cam groove that allows the extent to which the object is driven per unit of rotational angle by which the cylinder rotates to be altered, can be formed by using a rotational-extraction type mold by designing a cam groove of a specific shape to be formed in the inner circumferential surface of the cylinder.

BEST MODE FOR CARRYING OUT THE INVENTION

Figure 10:
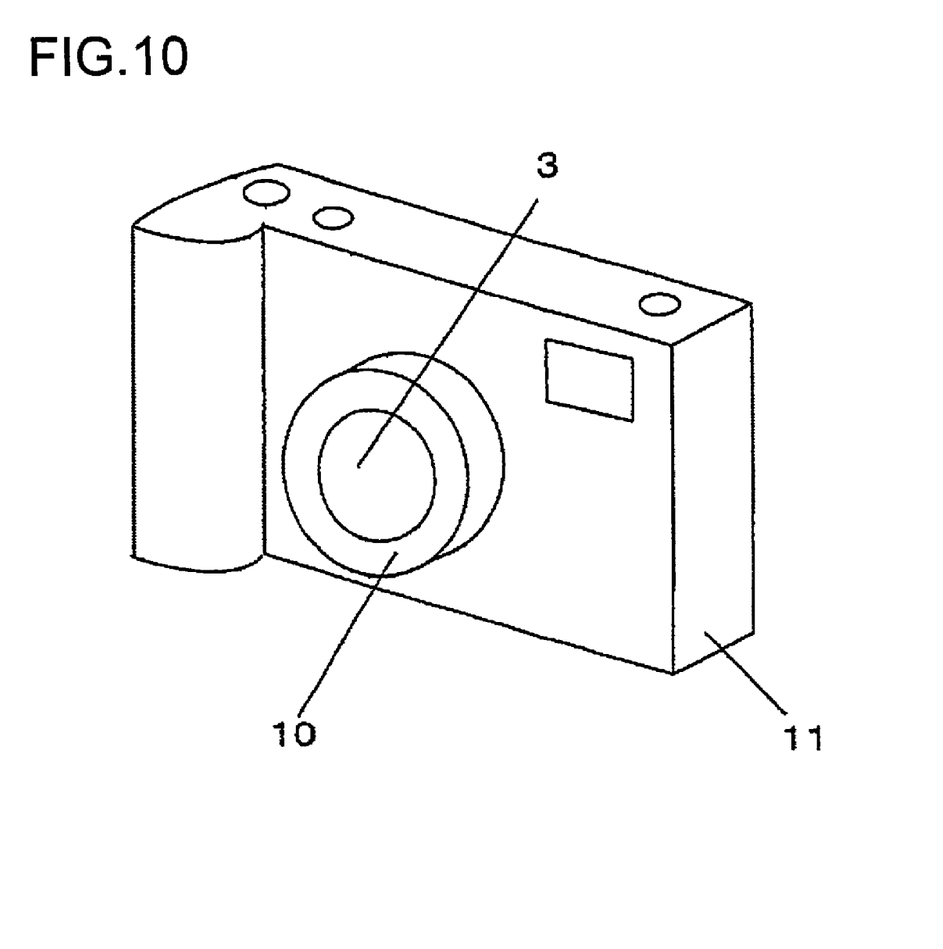
FIG. 10 is a perspective of a camera mounted with the lens barrel achieved in the embodiment.

In reference to FIGS. 1 through 5, an embodiment achieved by adopting the present invention in a zoom lens barrel in a camera is explained. FIG. 10 is an external view of a camera 11 mounted with a lens barrel 10 achieved in the embodiment. The camera 11 may be, for instance, a silver halide film-type camera, a digital camera or a video camera. The following explanation is provided by assuming that the lens barrel 10 is mounted at a digital camera.

Figure 1:
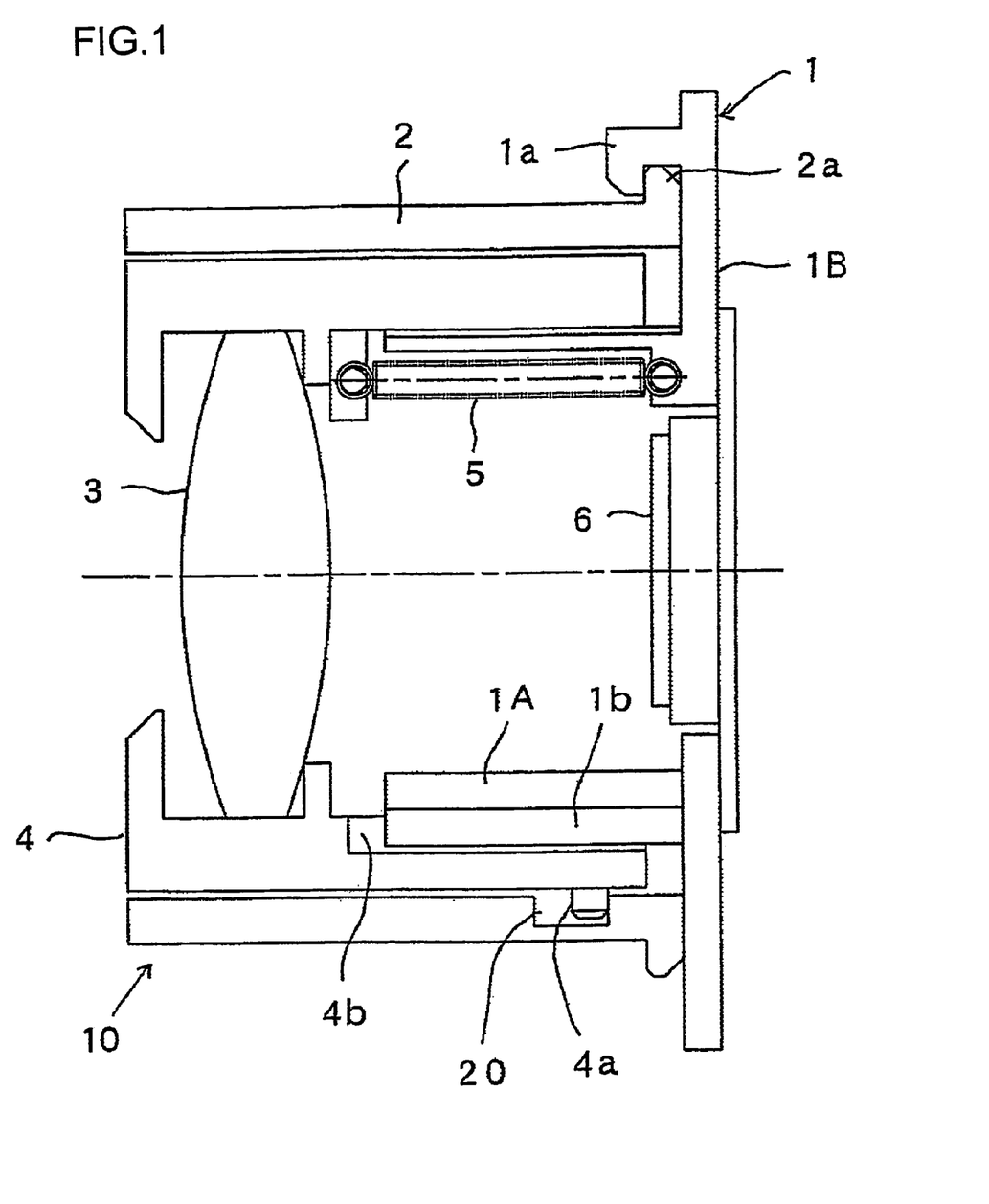
FIG. 1 is a sectional view of a camera lens barrel achieved in an embodiment of the present invention in a retracted state, taken on a plane containing the optical axis.
Figure 2:
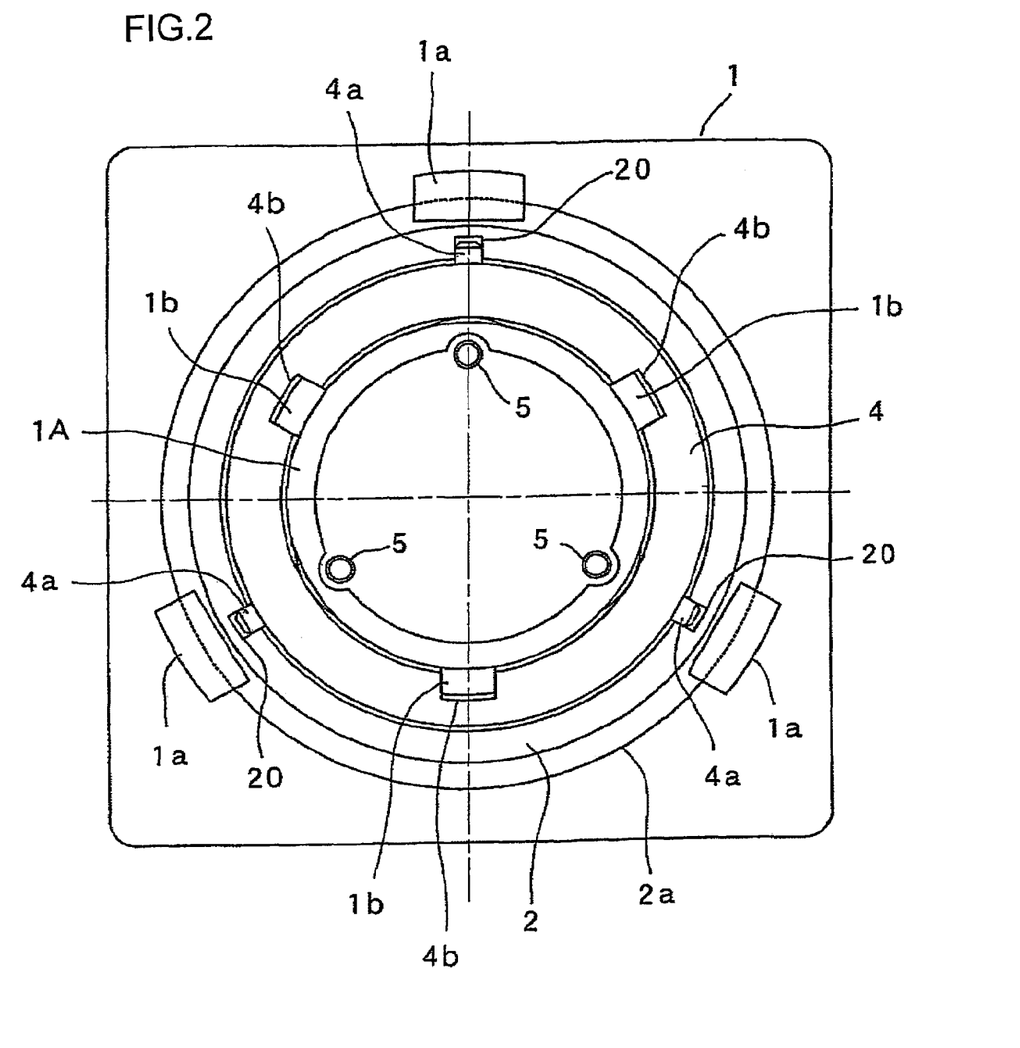
FIG. 2 is a sectional view of the lens barrel in FIG. 1, taken on a plane perpendicular to the optical axis.

FIG. 1 is a sectional view of the lens barrel 10 achieved in the embodiment, taken on a plane containing the optical axis and FIG. 2 is a sectional view of the lens barrel taken on a plane perpendicular to the optical axis. A holding member 1 is an integrated unit constituted with a fixed tube 1A and a holding unit 1B of an image sensor 6. At the holding member 1, a plurality of projecting tabs 1a are formed and a flange portion 2a of a cam cylinder 2 are rotatably engaged with the tabs 1a. The cam cylinder 2 is a small cylinder with three cam grooves 20 formed at the inner circumferential surface thereof. The cam cylinder 2 has a diameter of approximately 20 mm or less and is thus too small to allow a plurality of split molds to be used when forming the cam grooves 20.

Figure 3:
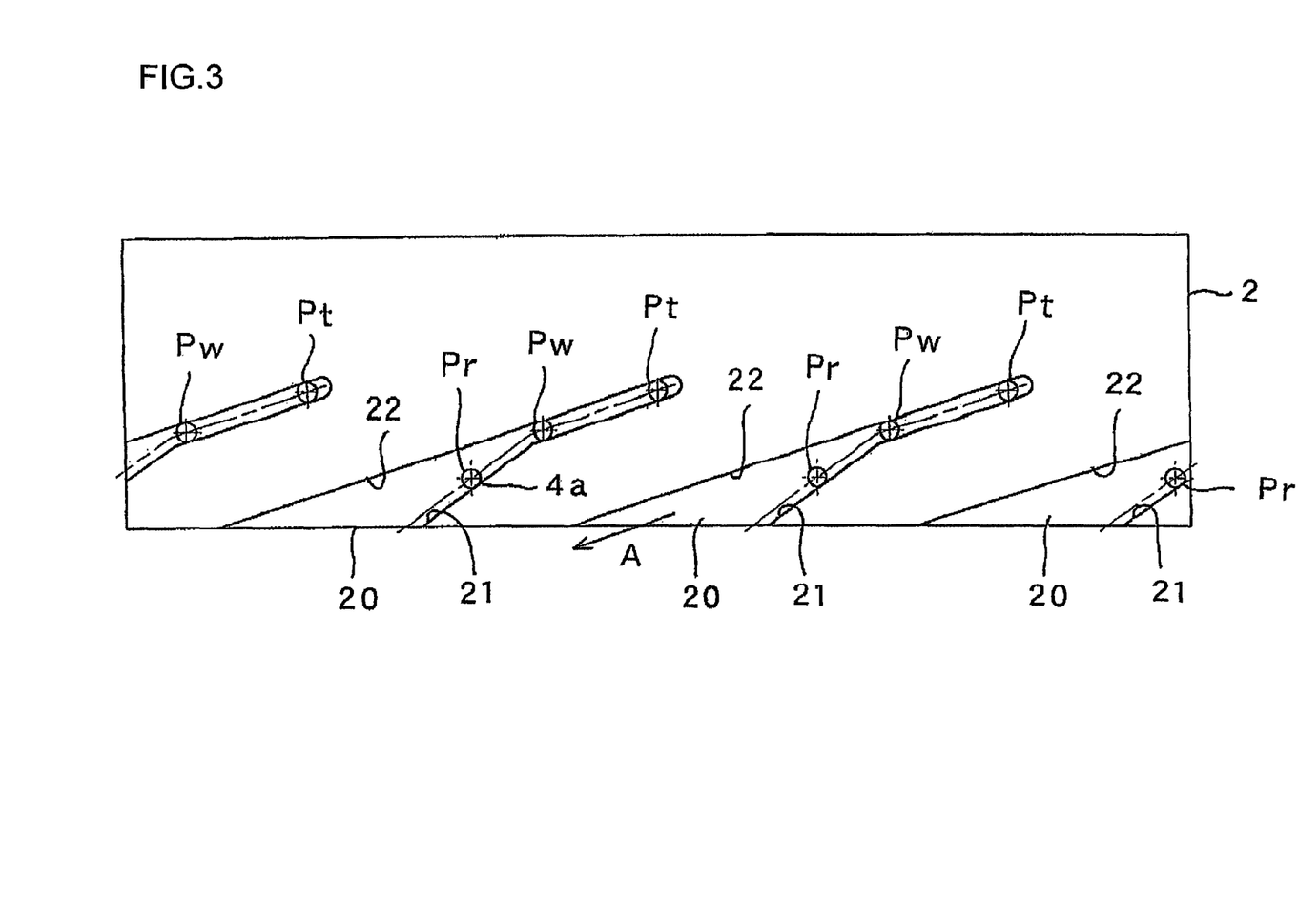
FIG. 3 is a plan development of the cam cylinder.

FIG. 3 is a development of the cam cylinder 2. The cam grooves 20 are each constituted with a recess ranging from one end face of the cam cylinder 2 (the lower end surface in the figure, i.e., the surface coming in contact with the holding unit 1B of the holding member 1) toward the other end, so as to allow a one-piece forming mold used to form the cam grooves 20 to be extracted through rotational extraction. While the cam grooves 20 formed by using the mold assume a shape that allows the mold to be extracted through rotational extraction, the shape of the cam grooves is to be described in detail later.

A lens holding tube 4, which holds a lens 3, is disposed between the cam cylinder 2 and the fixed tube 1A with three cam followers 4a at the lens holding tube 4 each engaged in one of the three cam grooves 20 at the cam cylinder 2. In addition, projecting portions 1b formed as an integrated part of the fixed tube 1A engage in linear guide grooves 4b formed at the inner circumferential surface of the lens holding tube 4 so as to allow the lens holding tube 4 to be guided as it moves along the optical axis by disallowing rotation of the lens holding tube 4 relative to the fixed tube 1A. As the cam cylinder 2 is caused to rotate by a zoom motor (not shown), displacement of the cam grooves 20 drives the lens holding tube 4 via the cam followers 4a, allowing the lens holding tube 4 and the lens 3 to move forward/backward as one along the optical axis. It is to be noted that the central axis (rotational axis) of the cam cylinder 2 aligns with the optical axis of the lens 3.

Figure 4:
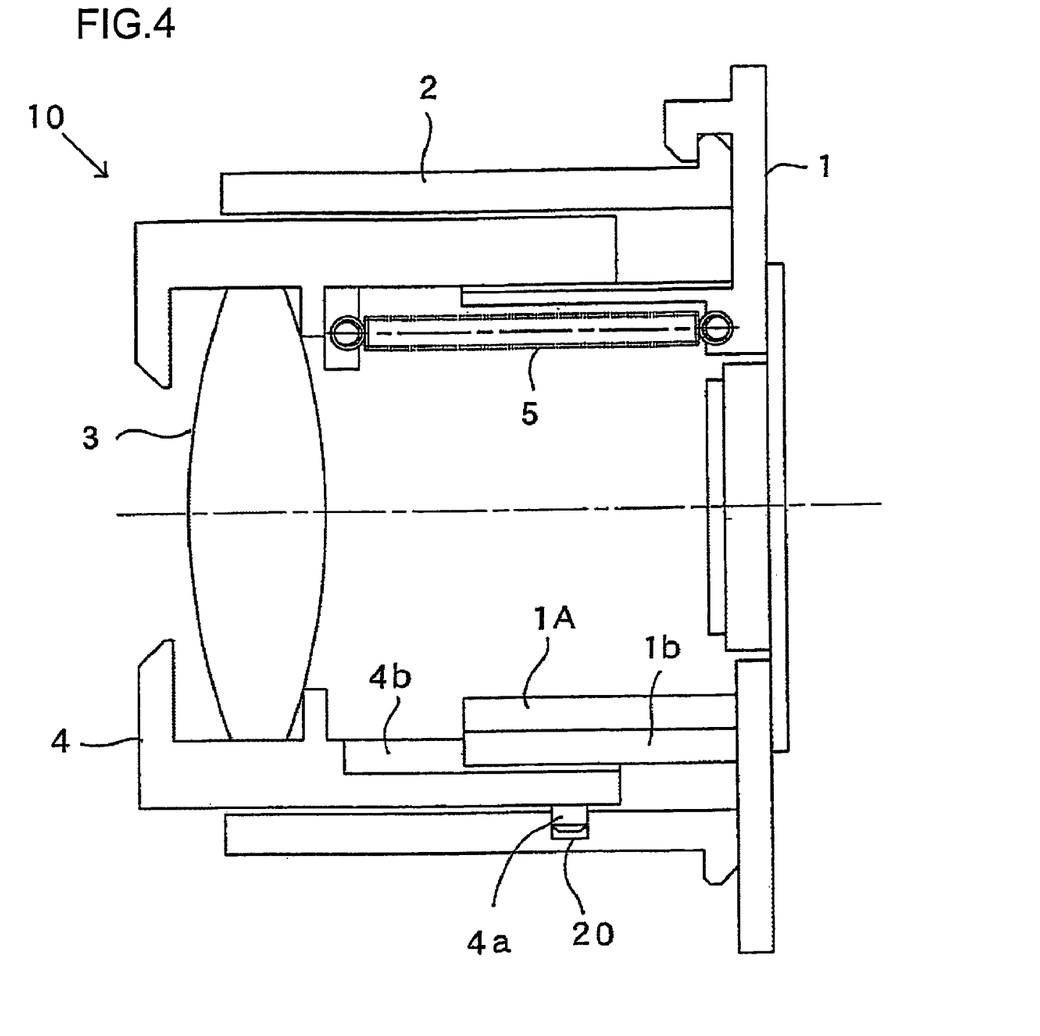
FIG. 4 shows the lens barrel in FIG. 1 in a first drive state.
Figure 5:
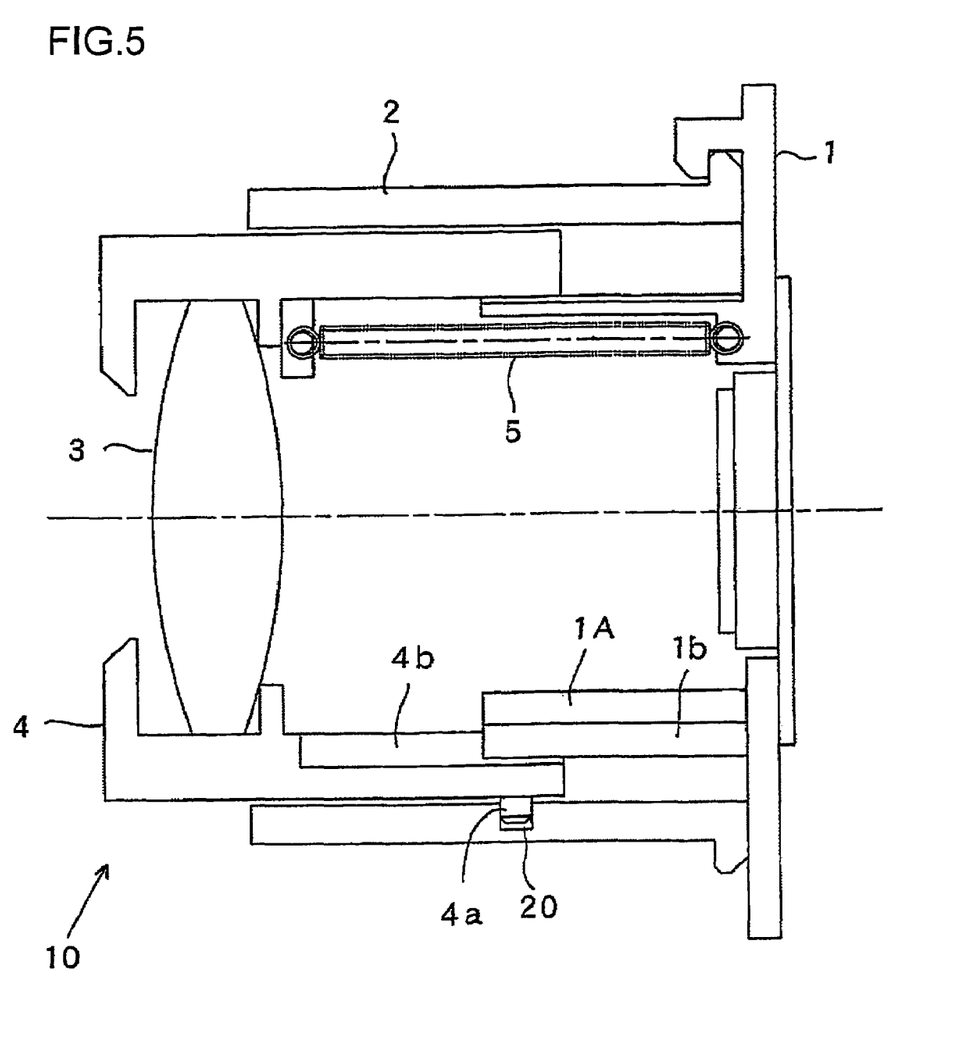
FIG. 5 shows the lens barrel in FIG. 1 in a second drive state.

FIG. 1 shows the lens barrel with the lens holding tube 4 and the lens 3 assuming the most driven-in position, i.e. the retracted position, FIG. 4 shows the lens barrel with the lens holding tube 4 and the lens 3 having been driven out to a first drive position and FIG. 5 shows the lens barrel with the lens holding tube 4 and the lens 3 having been further driven out to a second drive position. When the power to the camera 11 is off, the lens 3 holds itself at the retracted position and then, as the power is turned on, it is automatically driven out to the first drive position. Subsequently, the zooming operation is executed over the range between the first drive position and the second drive position in response to an operation of a zoom button (not shown), and a photographing operation is allowed if the lens holding tube 4 and the lens 3 assume a position between the first drive position and the second drive position. In response to a power off operation, the lens 3 is automatically driven in to the retracted position, and then, the power actually goes off.

Tension springs 5 held at spring retaining portions at the lens holding tube 4 and the fixed tube 1A impart a force so as to press the cam followers 4a against side surfaces 21 of the cam grooves 20 on the lower side in FIG. 3 (toward the holding unit 1B of the holding member 1) as shown in FIG. 3. Since the shape of the surfaces 21 substantially determine the movement of the lens 3, the surfaces 21 are hereafter referred to as cam surfaces. Pr, Pw and Pt in the figure each indicate the position of the cam follower 4a relative to the corresponding cam surface 21 and respectively correspond to the retracted position, the first drive position and the second drive position. The tension springs 5 are pressing members that press the cam followers 4a against the cam surfaces 21.

The cam surfaces 21 are formed as bent surfaces instead of straight surfaces with the gradient thereof altered within the cam surfaces. Namely, the cam surfaces 21 assume varying gradients. The range between the first drive position and the second drive position (between Pw and Pt) is a zoom range over which the lens position affects photographing results. For this reason, the lens position must be controlled with a high level of accuracy. Accordingly, in order to displace the drive target object, i.e., the lens 3, in smaller increments relative to the unit rotational angle by which the cam cylinder 2 rotates, the cam surfaces 21 assume a relatively shallow gradient over the zoom range (first cam surfaces). The lens 3 is set/reset over the range between the retracted position and the first drive position (between Pr and Pw). Since this range is not the zoom range, the lens position does not need to be controlled with a very high level of accuracy. Accordingly, the cam surfaces 21 assume a steeper gradient over this range (second cam surfaces) so as to drive the lens further relative to the unit rotational angle of the cam cylinder 2. As a result, the lens 3 can be driven at a higher speed over this range and thus, the lens can be set or reset more quickly as the power is turned on/off to assure improved operability.

It is to be noted that the zoom range (the range between Pw and Pt) defines the range over which the cam followers 4a are allowed to move when a photographing operation is executed in the camera 11 mounted with the lens barrel 10, whereas the set/reset range (the range between Pr and Pw) defines the range over which the cam followers 4a are allowed to move during the preparatory phase in which the camera 11 is not engaged in photographing operations. The word "shallow" as in "shallow gradient" is used to mean that the extent to which the drive target object is made to move per unit rotational angle of the cylinder, i.e., the cam cylinder 2, is small.

Since the cam cylinder 2 is small, split molds, which have less strength, cannot be used when forming the inner circumferential surface of the cam cylinder. Instead of split molds, a one-piece mold is used to form the inner circumferential surface of the cam cylinder 2 and then the mold is extracted through rotational extraction. In order to allow the mold to be extracted through rotational extraction, the cam surfaces 21 alone are made to include a bend and side surfaces 22 facing opposite the cam surfaces 21, located on the upper side in the figure, are straight. In other words, the cam grooves 20 are not bent over their entire length, in the embodiment. The one-piece mold is designed so that a specific shape is achieved over its cam groove formation areas to form bent cam surfaces 21 and straight side surfaces 22 facing opposite the cam surfaces at the cam grooves 20.

The gradient of the opposite side surfaces 22 is set equal to the gradient of the cam surfaces 21 over the zoom range, and the distance between the surfaces 21 and 22 over the zoom range, i.e., the width of the cam grooves 20 over the zoom range, is set substantially equal to the diameter of the cam followers 4a. As a result, the cam followers 4a are guided by both surfaces 21 and 22 over the zoom range, as through standard cam grooves, so as to assure accuracy in the lens drive. Over the set/reset range, the cam grooves 20 assume a greater width toward the bottom of the figure and thus, the opposite side surfaces 22 are not used to guide the cam followers 4a. However, since the cam followers 4a are pressed against the cam surfaces 21 by the tension springs 5, the lens can still be driven smoothly over this range where the lens position does not need to be controlled with such a high level of accuracy.

The mold is extracted from the cam cylinder 2 along the axial direction by rotating the mold around the central axis (aligned with the optical axis of the lens 3) of the cam cylinder 2. Since the cam groove formation areas of the mold are eased out along the direction indicated by the arrow A in the figure from the cam grooves 20 along the surfaces 22, the mold can be extracted without difficulty.

In order to ensure that the mold is extracted through rotational extraction with no problem, the gradient of the opposite side surfaces 22 facing opposite the cam surfaces 21 at the cam grooves 20 must be set equal to or shallower than the gradient of the cam surfaces 21 over areas where the cam surfaces assume the shallowest gradient, as shown in FIG. 3. This requirement is satisfied in each of the other examples of cam grooves 20 presented in FIGS. 6 through 9.

Figure 6:
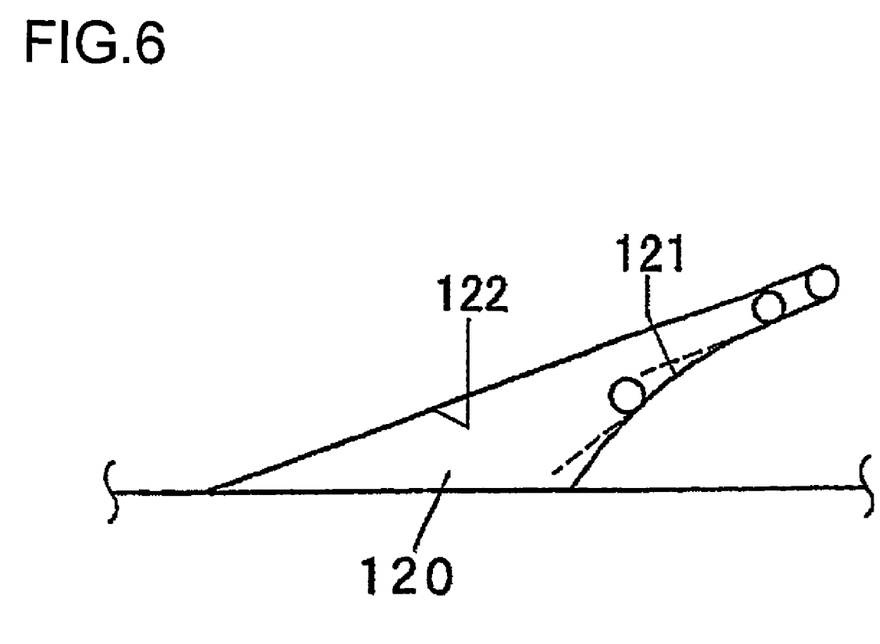
FIG. 6 presents an example of a cam groove with the gradient of the cam surface changing in three stages.
Figure 7:
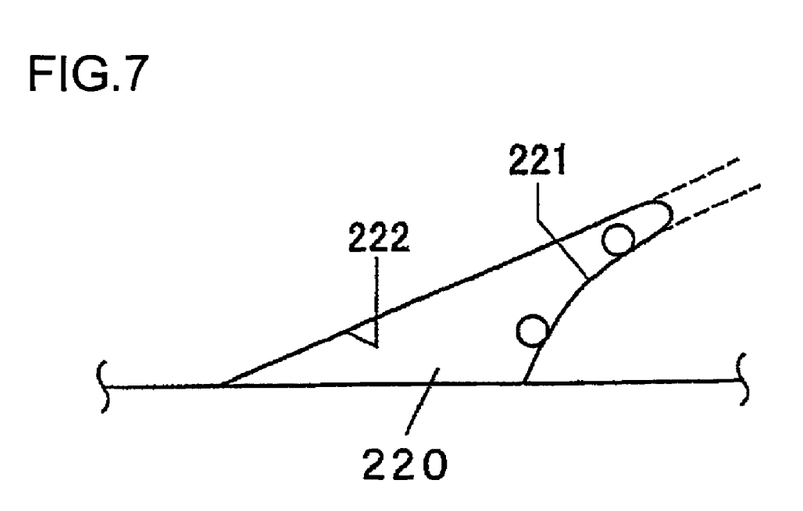
FIG. 7 presents an example of a cam groove with the gradient of the cam surface changing gradually so as to form a curved surface.
Figure 8:
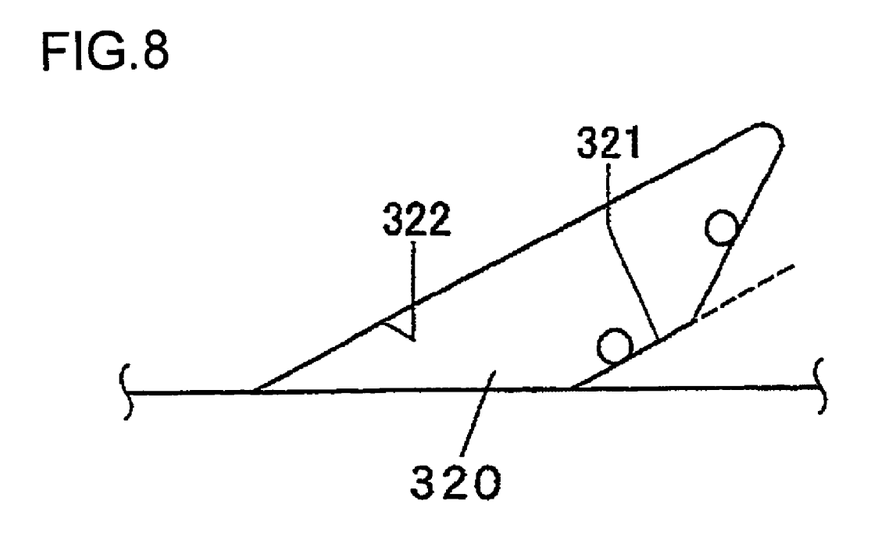
FIG. 8 presents an example of a cam groove with the gradient of the cam surface altered in a reversal from the example presented in FIG. 3.
Figure 9:
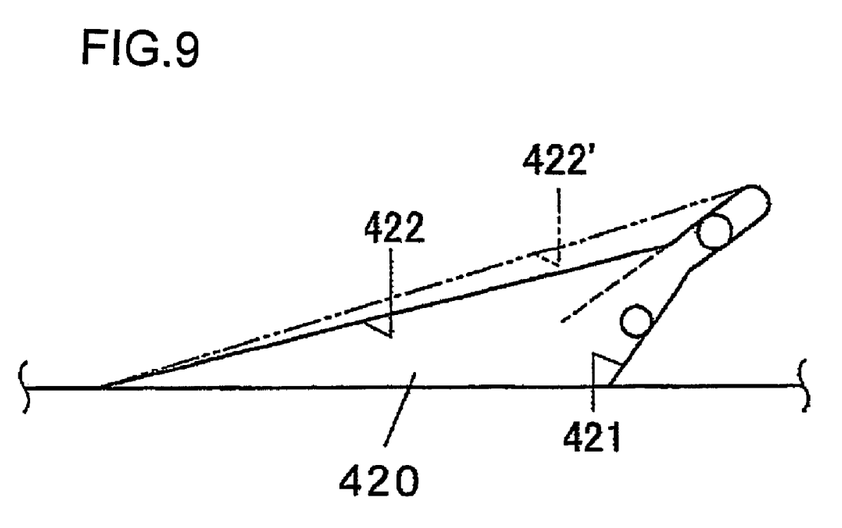
FIG. 9 presents an example of a cam groove with the gradient of the surface facing opposite the cam surface set shallower than the gradient of the cam surface.

FIG. 6 presents an example with the gradient of a cam surface 121 at a cam groove 120 changing in three stages. The gradient of an opposite side surface 122 is equal to the gradient at the front end area of the cam surface 121 (over the area where the gradient is at its shallowest) corresponding to an area near the second drive position. FIG. 7 shows a cam groove 220 with a cam surface 221 assuming a curved contour. The gradient of an opposite side surface 222 is equal to the front end area of the cam surface 221 (over the area where the gradient is at its shallowest) corresponding to the second drive position. While the gradient of a cam surface 321 at a cam groove 320 shown in FIG. 8 changes in a reversal from that at the cam surfaces 21 shown in FIG. 3, the gradient of the opposite side surface 322 is set equal to the gradient at the base end area (where the gradient is at its shallowest) of the cam surface near the opening end of the cam groove 320. While FIG. 9 shows a cam groove 420 with its cam surface 421 assuming a shape substantially identical to that shown in FIG. 3, an opposite side surface 422 is bent so as to assume a shallower gradient-on the base end side. The cam groove 420 may have a straight opposite side surface 422' with a straight contour, as indicated by the two-point chain line, instead of the bent opposite side surface 422. It is to be noted that the width of the cam groove 420 is greater than the diameter of the cam follower 4a over the zoom range in this case.

While an explanation is given above in reference to the embodiment on an example in which the cam drive mechanism according to the present invention is adopted in the lens drive mechanism in the lens barrel 10, the cam drive mechanism according to the present invention may also be adopted in lens drive mechanisms in telescopes and binoculars. In addition, application of the present invention is not limited to lens drive mechanisms, and the present invention may be adopted in all types of cam drive mechanisms as long as an object needs to be driven linearly through a cam groove formed at the inner circumference of a cylinder.

Also, while an explanation is given above on an example in which the zooming operation is executed by driving the lens with a zoom motor in the lens barrel 10, the present invention is not limited to this example and it may be adopted in a structure that includes a cam cylinder 2 rotated manually to displace the lens 3 and the lens holding tube 4 along the optical axis.

While the invention has been particularly shown and described with respect to a preferred embodiment and variations thereof by referring to the attached drawings, the present invention is not limited to these examples and it will be understood by those skilled in the art that various changes in form and detail may be made therein without departing from the scope and teaching of the invention.

The disclosure of the following priority application is herein incorporated by reference:

Japanese Patent Application No. 2005-179066 filed Jun. 20, 2005.

The invention claimed is:

1. A cam drive mechanism, comprising:
   a cylinder in which a cam groove is formed from one end face of an inner circumferential surface toward another end with a forming mold;
   a drive target object that comprises a cam follower to engage in the cam groove and is linearly driven along a rotational axis of the cylinder as the cylinder rotates; and
   a pressing member that presses the cam follower against a cam surface constituting a side surface of the cam groove, wherein:
   the cam surface is formed to have varying gradients so as to enable adjustment of an extent of displacement of the drive target object per unit of rotational angle by which the cylinder rotates and the cam groove is formed in a shape that allows the forming mold to be extracted from the cylinder through rotational extraction.

2. A cam drive mechanism according to claim 1, wherein:
   another side surface of the cam groove facing opposite the cam surface has a gradient equal to or shallower than a gradient of the cam surface over an area with a shallowest gradient.

3. A cam drive mechanism according to claim 1, wherein:
   the cam surface comprises a first cam surface and a second cam surface with a gradient shallower than the first cam surface; and
   a gradient of the entire other side surface facing opposite the cam surface at the cam groove is equal to a gradient of the second cam surface and the other side surface and the second cam surface are set apart from each other over a distance substantially equal to a diameter of the cam follower.

4. A cam drive mechanism according to claim 1, wherein:
   the cylinder is a cam cylinder with a diameter equal to or less than 20 mm, that is formed by using a one-piece forming mold.

5. A cam drive mechanism according to claim 1, wherein:
   the cam groove has a greater width toward the one end face.

6. A cam drive mechanism according to claim 1, wherein:
   the drive target object comprises a lens; and
   the rotational axis of the cylinder aligns with an optical axis of the lens.

7. A cam drive mechanism according to claim 6, wherein:
the cam surface comprises a first area over which the lens moves between a retracted position and a first drive position, and a second area over which the lens moves between the first drive position and a second drive position; and
a gradient at the first area is shallower than a gradient at the second area.

8. A cam drive mechanism according to claim 7, wherein:
the first area is a lens set/reset area used during a preparatory phase for a photographing operation by using the lens, and the second area is a zoom area used for zooming during the photographing operation by using the lens.

9. A lens barrel, comprising:
a cam drive mechanism according to claim 6.

10. A camera, comprising:
a lens barrel according to claim 9.

* * * * *